M. KROTA.
RIND CUTTER AND CORER FOR CITRUS FRUIT.
APPLICATION FILED MAR. 19, 1921.

1,389,765.

Patented Sept. 6, 1921.

Inventor
MICHAEL KROTA
By Zoltan S. Polachek
Attorney

UNITED STATES PATENT OFFICE.

MICHAEL KROTA, OF HOLYOKE, MASSACHUSETTS.

RIND CUTTER AND CORER FOR CITRUS FRUIT.

1,389,765.  Specification of Letters Patent.  Patented Sept. 6, 1921.

Application filed March 19, 1921. Serial No. 453,630.

*To all whom it may concern:*

Be it known that I, MICHAEL KROTA, citizen of the United States, residing at Holyoke, in the county of Hampden and State of Massachusetts, have invented certain new and useful Improvements in Rind Cutters and Corers for Citrus Fruit, of which the following is a specification.

This invention relates to a rind and core removing implement intended more especially for use in connection with citrus fruit such as grapefruit.

The invention has for an object to provide a simple, inexpensive implement which will operate efficiently and quickly to remove the core and rind of the fruit.

A further object is to provide for ready adjustment of the implement to fruit of different sizes.

For further comprehension of the invention, and of the objects and advantages thereof, reference will be had to the following description and accompanying drawings, and to the appended claims in which the various novel features of the invention are more particularly set forth.

Figure 1 of the drawings is a perspective view of an implement constructed according to the invention, showing it in operative position with respect to a section of a grapefruit.

Figure 1:
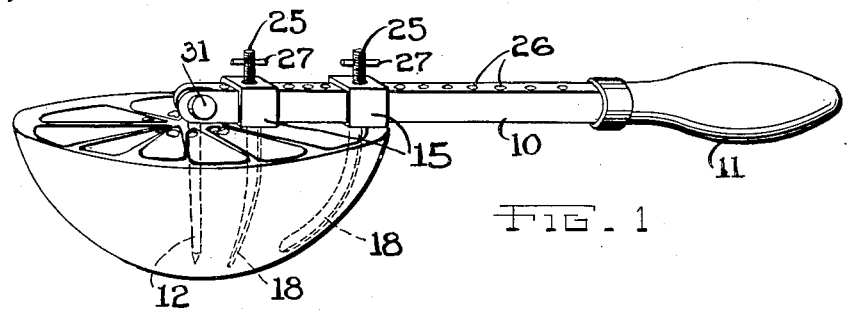

As here shown my improved implement comprises a shank-bar 10, preferably of rectangular cross section, and having a handle 11 fixed to one end thereof in any suitable manner. The opposite end of the bar has adjustably connected thereto a pin 12 which forms the pivot pin on which the implement turns, the manner of mounting this pin being referred to in detail later.

The implement is provided with a pair of knives adapted to remove respectively the core and rind and which are carried by the bar 10. To support these knives a pair of similar hollow heads 15 are adjustably mounted on the bar, the vertical dimensions of the openings 16 in the respective heads being somewhat greater than the thickness, vertically considered of the bar 10. Formed on the lower sides of these heads 15 are basses 17 in which are suitably fixed the haft ends of the knife blades 18 which extend downwardly therefrom and may be suitably curved to properly engage the fruit.

Adjustment of these knives along the bar 10 is preferably provided for as follows:

Slidable in sockets such as 20 in the lower walls of the heads 15 are headed pins 21 which project into the openings 16 and are pressed against the underside of the bar 10 by light coiled springs 22, a series of rounded notches or recesses 23 being spaced along the underside of the bar 10 to receive the heads of the pins 21.

Threaded vertically through the top walls of the heads 15 are clamp screws 25 having rounded heads on their lower ends adapted to engage in the proper ones of a second series of notches or recesses 26 spaced along the top face of the bar 10, these screws 25 have cross pins 27 fixed in their upper ends to provide handles whereby they may be turned. By threading the screws inwardly until the pins 21 engage the bottoms of the sockets 20 the heads 15 are locked tightly to the bar 10, while the light pressure of the springs 22 on the pins 21 causes the heads of said pins to act as feelers by riding on the notches 23 as the heads are moved along the bar 10 to adjust the positions of the knives 18, so that the proper registry of the pins 21 and screws 26 with the notches 23 and 26 is immediately determined.

Figure 2:
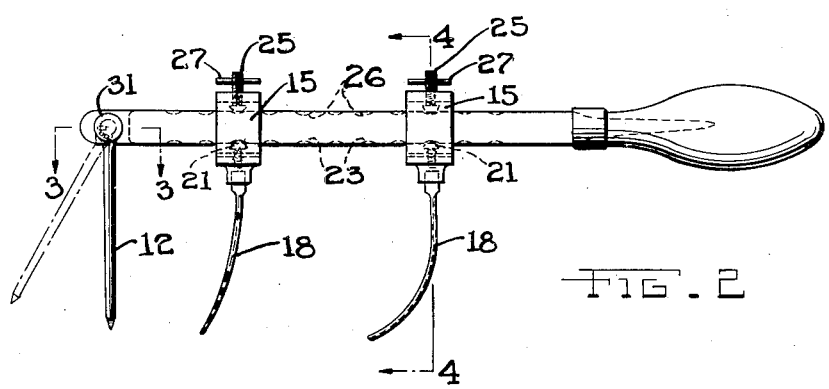
Fig. 2 is a side view of the implement alone.
Figures 3, 4, 5:
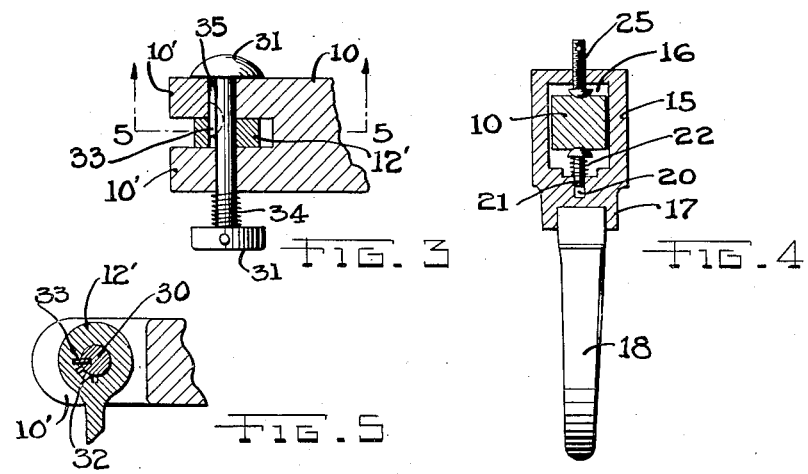
Fig. 3 is an enlarged fragmentary horizontal section on the line 3—3 of Fig. 2.
Fig. 4 is an enlarged transverse section on the line 4—4 of Fig. 2.
Fig. 5 is a horizontal section on the line 5—5 of Fig. 4.

As previously pointed out, the pivot pin 12 has an adjustable connection with the bar 10, this connection being arranged to permit of the variation of the angular relation of the pin and bar, as indicated by the dot and dash lines in Fig. 2, which variation may be desirable when operating on different sections of fruit. As here shown the pin 12 has an eye 12' on its upper end which projects between the bifurcated end elements 10' of the bar 10 and takes over a pintle 30 slidable in said end elements, this pintle having heads 31 on opposite ends. The aperture through the eye 12' has a series of angularly spaced grooves 32 in the wall thereof while the pintle 30 carries a key 33 adapted to fit in either of said grooves 32, the pintle being normally held in position with the key 33 engaging in one of the grooves by a coiled expansion spring 34 surrounding one end of the pintle. A key-way 35 is formed in one of the elements 10' to slidably receive the key 33. By moving the pintle 30 against the spring 34 the key 33 is moved longitudinally out of the groove 32 with which it may be engaged, permitting the pin 12 to be swung until a different groove registers with the key, which enters therein when the pintle is released.

It is believed that the manner of use of my improved implement will be readily understood from the above description, the knives being adjustable to different size of fruit, the device being inserted into the fruit as indicated in Fig. 1 with the pin 12 coaxial with the fruit and upon the handle 11 being revolved on said pin the core and rind will be severed.

Having thus described my invention what I claim as new and desire to protect by Letters Patent of the United States is as follows:—

1. A device of the class described, comprising a bar, a pivot pin on one end of said bar, a pair of knives carried by said bar, and means for securing said knives to said bar in adjusted positions longitudinally thereof, and means for varying the angular relation of said pivot pin with said bar.

2. In a device of the class described, a bar, a pivot pin therefor, a hollow head adjustable along said bar, a knife secured to said head, said bar having notches spaced along opposed sides thereof, and clamp elements on said head adapted to engage in said notches, and a spring urging one of said clamp elements into engagement with the said bar.

3. In a device of the class described, a bar, having notches spaced along opposed sides thereof, a hollow head adjustable along said bar, a knife fixed to said head, a pin slidable in a socket in said head, a spring urging said pin toward said bar, and a screw threaded into said head in axial alinement with said pin and adapted to bear on said bar in opposition to said pin.

4. In a device of the class described, a bar, a knife carried by said bar, a pivot pin having an eye at one end, a pintle slidably carried by said bar and engaging in said eye, the aperture through said eye having a series of circumferentially spaced grooves in its wall, a key carried by the said pintle and adapted to be moved into or out of engagement with a selected groove in said eye by longitudinal movement of said pin.

5. In a device of the class described, a bar, a knife carried by said bar, a pivot pin having an eye at one end, a pintle slidably carried by said bar and engaging in said eye, the aperture through said eye having a series of circumferentially spaced grooves in its wall, a key carried by the said pintle and adapted to be moved into or out of engagement with a selected groove in said eye by longitudinal movement of said pin, and a spring normally holding said pintle in position with the said key engaging in one of said grooves.

In testimony whereof I have affixed my signature.

MICHAEL KROTA.